April 30, 1935.  C. F. THOMPSON  1,999,794
AUTOMATIC CONTROL FOR ICE CREAM FREEZERS
Filed Aug. 25, 1934   2 Sheets-Sheet 1

Inventor:
Clifford F. Thompson
by Albert Scheible
Attorney

April 30, 1935.  C. F. THOMPSON  1,999,794
AUTOMATIC CONTROL FOR ICE CREAM FREEZERS
Filed Aug. 25, 1934  2 Sheets-Sheet 2

Inventor:
Clifford F. Thompson
by Albert Scheible
Attorney

Patented Apr. 30, 1935

1,999,794

UNITED STATES PATENT OFFICE 1,999,794

AUTOMATIC CONTROL FOR ICE-CREAM FREEZERS

Clifford F. Thompson, Chicago, Ill.

Application August 25, 1934, Serial No. 741,467

15 Claims. (Cl. 62—4)

My invention relates to an ice-cream freezer which has its agitator rotated by an electric motor, and in its general objects aims to provide automatic means for increasing the rotational speed of the agitator when the temperature of the cream has dropped to a certain degree, and for informing the user when the speed is thus changed. Furthermore, my invention aims to reduce the warming effect on the freezer of heat radiated by the motor, so as to reduce the length of time required for the freezing, and also aims to improve the palatability of the resulting ice-cream by preventing the production of ice crystals.

When a housewife is making a frozen dessert in a household type of motor-driven freezer, it is difficult for her to estimate the length of time which will be required for freezing the cream, mousse or the like; and this difficulty increases when the freezing is being effected within an electric refrigerator so that the user cannot see how fast or slow the agitator shaft is rotating. Owing to this difficulty, an inexperienced maker of such a frozen dessert is apt to continue the agitation even after the mixture has become so hard as to slow down the motor, by which time the temperature has dropped sufficiently to cause water to separate out into ice crystals which mar the palatability of the dessert, and the speed of the agitator is too slow to whip the dessert to a fluffy consistency.

In experimenting along this line I have found that such a formation of ice crystals can readily be avoided if the agitation is discontinued soon after the temperature of the cream or the like has fallen somewhat below the freezing point of water; and I have also discovered that if the rotational speed of the agitator is increased as soon as the temperature of the mixture has thus fallen, a continuing of the agitation at a decidedly increased speed will whip and "fluff up" the mixture so as to enhance its palatability in addition to avoiding the formation of ice-crystals.

In addition, I have found that even a lay user of a motor-driven freezer can readily estimate the relatively short period of time required for this high-speed agitation if she is either visually or orally informed of the time when this higher agitation begins.

In utilizing the just recited observations and discoveries according to my invention, I preferably employ a freezer having a motor driven agitator and also having means for initially restricting the rotational speed of the agitator to a speed considerably below the higher speed at which the motor would otherwise rotate the agitator. Then I provide a thermostatic switch (responsive to the temperature of the mixture which is being frozen) for controlling the change of the agitator speed from its said restricted speed to its higher speed; and I also provide electrically actuated means for informing the user when the thermostatic switch effects this change.

Illustrative of my invention,

Fig. 1 is a somewhat diagrammatic perspective view of an automatically controlled electric freezer embodying my invention and suitable for use within a cooled chamber, such as the interior of a household type of electric refrigerator, with a portion of the cream container and of the casing for the normally open thermostatic control-governing switch broken away, and with a centrifugal control switch on the motor.

Figure 1:
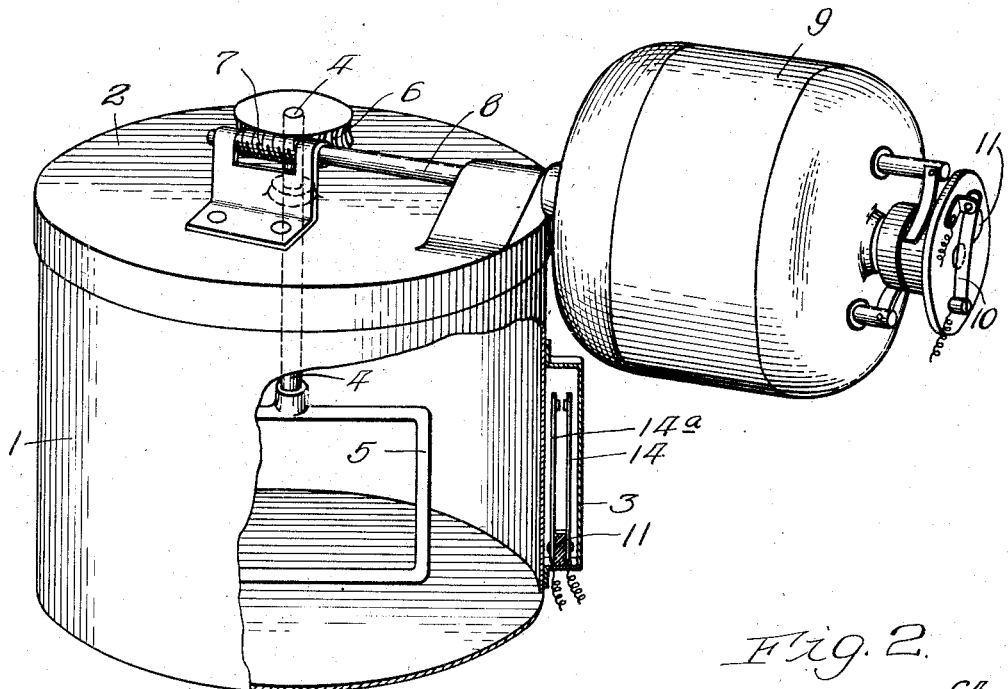
Figure 2:
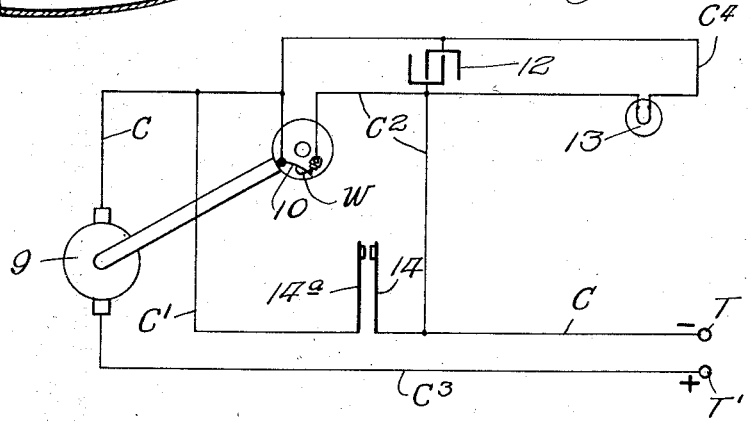
Fig. 2 is a diagram of the electric connections to the motor and the control devices of Fig. 1, to an indicator lamp, and to a condenser for dampening sparks at the contacts of the speed-controller of the motor.

In carrying out my invention after the manner of Figs. 1 and 2 I employ an alternating current motor of the type in which a centrifugal governor normally limits this speed to a rate which is a minor fraction of the maximum speed of the motor when idle. Motors equipped with such centrifugal governors or speed-regulators have long been in use and commonly include a centrifugally actuated switch member which may control either the entire circuit to the motor or may merely control one or more windings of the motor. Then I provide electrical connections between the speed-controlling switch and a normally open thermostatic switch associated with the container for the mixture which is being frozen, whereby the thermostatic switch (when closed in response to a drop in its temperature) will short-circuit the speed-control switch to render the latter inoperative, thereby permitting the motor to operate at the higher speed at which it would run under the same load if not equipped with the speed governor.

In Fig. 1, the cream container comprises a metal receptacle 1 and a cover 2, and a switch casing 3 fastened to one side of the receptacle. Extending through the cover 2 is a shaft 4 to which an agitator 5 is fastened below the cover, which shaft has a worm wheel 6 fastened to its upper end. Meshing with this worm wheel 6 is a worm 7 fast upon the outer end of the shaft 8 of a motor 9 provided with a centrifugal switch including a flexible switch member 10 which has a weight 11 fastened to it near the free end of that member, this member being disposed so that the action of centrifugal force on the weight will flex the said member out of its illustrated circuit-closing position.

Housed by the switch casing 3 is a thermostatic switch including two resilient metal strips 14 and 14a which have their free ends normally spaced from each other (as shown in Fig. 1) at least one of these strips being bi-metallic and having its constituent metals so arranged that a drop in temperature to about 28 degrees Fahrenheit will cause that strip to flex toward and into contact with the other strip. When thus contacting, these two strips close a circuit $C^1$ (Fig. 2) in shunt with the circuit portion $C^2$ which is opened and closed by the speed-regulator switch 10 during the normal speed-controlling of the motor, the said circuit portion $C^2$ being interposed in the circuit C from one current-supply terminal T to one terminal of the motor 9, while the other terminal $T^1$ is connected directly to the motor by a circuit portion $C^3$.

With circuit connections as in Fig. 2, the operation of my automatically controlled freezer is as follows:

When the freezing is started (as by placing my motor and freezer assembly in an electric refrigerator) the metal strips 14 and 14a of the thermostatic switch are electrically separated from each other by the insulating block 11 to which the lower end portions of both strips are fastened, and by the air between the upper end portions of these strips. Being thus normally open, this thermostatic switch, although in shunt with the speed-control switch 10, has no effect on the latter switch. Consequently, the speed-control switch will operate in its usual manner for limiting the speed of the motor to approximately the maximum for which the last named switch was adjusted (as for example 1000 R. P. M.), so that the agitator 5 is rotated at a substantially constant speed until the temperature within the switch casing 3 (which temperature is approximately that of the cream in the receptacle 1) falls to the point for which the thermostatic switch was constructed.

When this drop in temperature is reached, the thermostatic strips 14 and 14a have flexed into contact with each other, thereby closing the circuit $C^1$ in shunt with the circuit $C^2$ of the speed-control switch 10, so as to render the latter switch inoperative. The motor is then free to run as fast as the resistance of the cream to the agitator permits it to do, thereby rotating the agitator at a so much higher speed as to fluff up the cream, in doing which it also prevents water from separating out into ice crystals.

To inform the user of the time at which this change in the rate of agitation automatically occurs, I desirably also provide a suitable signal, here shown as an incandescent lamp 13 in a circuit $C^4$ which is also in shunt with the circuits $C^1$ and $C^2$ in which the speed-control switch 10 and the thermally responsive strips (14 and 14a) respectively are disposed. Since these three circuits thus are in shunt with one another, this lamp which in practice would preferably be disposed outside the refrigerator, will be shunted by the normally closed speed-control switch 10 during the major portion of the freezing period, but will light up whenever this speed-control switch opens momentarily to keep down the speed of the motor. Consequently, the user can readily see from the flickering of this lamp (which will occur quite frequently with a sensitively adjusted centrifugal speed-control switch) that the cream has not yet been frozen to the desired degree.

However, as soon as the cream receptacle becomes so cold that the thermostatic strips 14 and 14a close the circuit C in which they are disposed, thereby closing a low resistance shunt around both the speed-control switch and the lamp, the lamp 13 will be extinguished, thereby informing the user that the cream has been duly frozen and is being whipped to a lighter consistency.

The user then can readily wait the short additional time which is required (according to the nature of the dessert which is being frozen) for having this dessert reach the desired consistency before shutting off the current and lifting the cover, agitator and motor assembly off the container and taking this assembly out of the refrigerator. Since the thermostatic switch closes automatically at the temperature for which it was constructed, the actual time required for the low speed operation of the agitator will vary with the temperature of the refrigerator or other cooling chamber in which the freezer is disposed, but no adjustments need to be made by the user for variations in this temperature, since the action of the switch is automatic.

By using a motor provided with a regulator which limits its speed to a rate considerably below the normal speed of the motor under the same load, I considerably reduce the current-consumption of the motor (which desirably is of an alternating current type), thereby correspondingly reducing the warming effect of the motor on the freezer and the air around the freezer. Consequently, I reduce the time required for freezing the cream or other dessert, in addition to improving the palatability of the dessert both by the final whipping or fluffing up and by preventing the formation of ice crystals.

When the motor is of the above described preferred type, namely one equipped with a centrifugally operated speed controller including a make and break switch, I preferably also connect a condenser 12 across the terminals of this switch 10 and also with the thermostatic switch, as shown in Fig. 2, so as to reduce the sparking at both of these switches.

However, the heretofore described use of a centrifugal regulator on the motor is only one of many means which may be employed according to my invention for effecting an automatic increase in the rotational speed of the agitator when the container has been chilled to a certain temperature.

However, it is not essential to my invention that the automatic change in the speed of the motor should be effected through the use of a centrifugal speed regulator as heretofore described, since suitable circuits can readily be employed in connection with other provisions for varying the motor speed.

Figure 4:
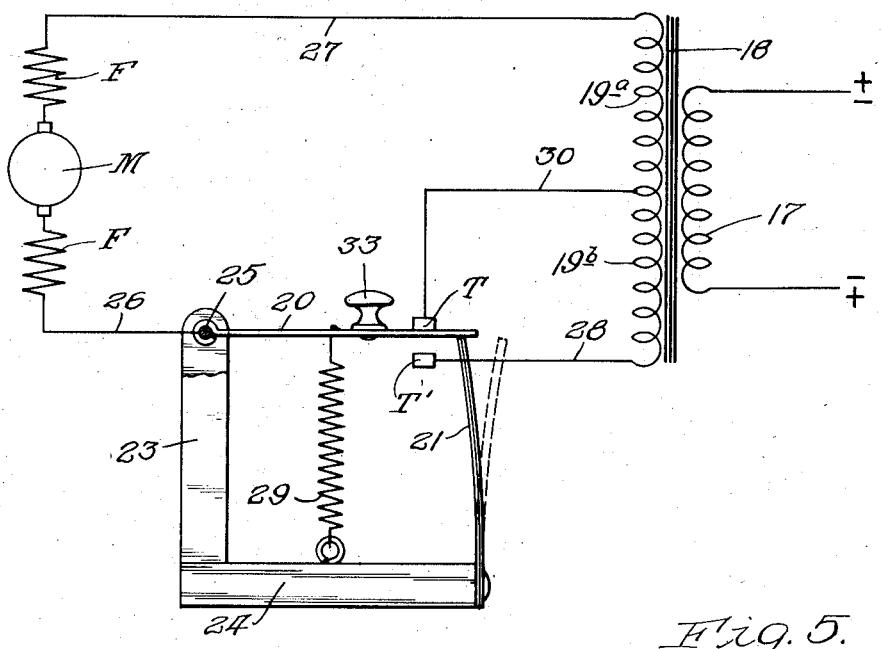
Fig. 4 is a diagram of an embodiment of my invention including a series motor operated through a tapped transformer, and including a trigger-action bimetallic switch associated with the transformer.

Thus, Fig. 4 diagrammatically shows an alternating current motor M to which current is supplied through its two field coils F by a tapped transformer which includes a primary coil 17, a core 18, and a secondary coil consisting of two sections 19a and 19b. The thermostatic switch in this embodiment desirably is of a "trigger action" type in which a movable switching member 20 is released from engagement with one terminal T by the flexing of a bimetallic strip 21, and in which the movement of the switching member is thereafter augmented and accelerated by a spring which thereafter holds the switching member in firm contacting relation with the second terminal T¹. As here shown, the switching member is pivoted to the upper end of the upright arm 23 of a supporting member made of insulating material, this arm being fastened to one end of a base 24, to the other end of which base the lower end of the bimetallic strip 21 is fastened.

The pivot pin 25 for the switching member 20 and one end of the secondary coil are connected to the outer ends of the field coils F respectively by wires 26 and 27, while the other end of the secondary coil is connected by a wire 28 to the second terminal T¹ which is spaced freely downward from the switch member 20. When the bimetallic strip 21 is at room temperature, this strip has its upper end supporting the switch member in contact with the upper terminal T, so that the motor is operated only through the upper section 19a of the secondary coil, which section has its lower end connected by a wire 30 to the upper terminal T.

However, when the bimetallic strip is flexed out of its just described disposition, as shown in dotted lines, a spring 30 quickly pulls the switch member away from the upper terminal and into contact with the lower terminal T¹ so as to make both sections of the secondary coil operative, thereby increasing the speed of the motor. With the picture type of thermostatic switch, the user would have to raise the switching member back to its original position after the bimetallic switch has again warmed up, as by lifting an insulating knob 33 fastened to the switching member.

Figure 5:
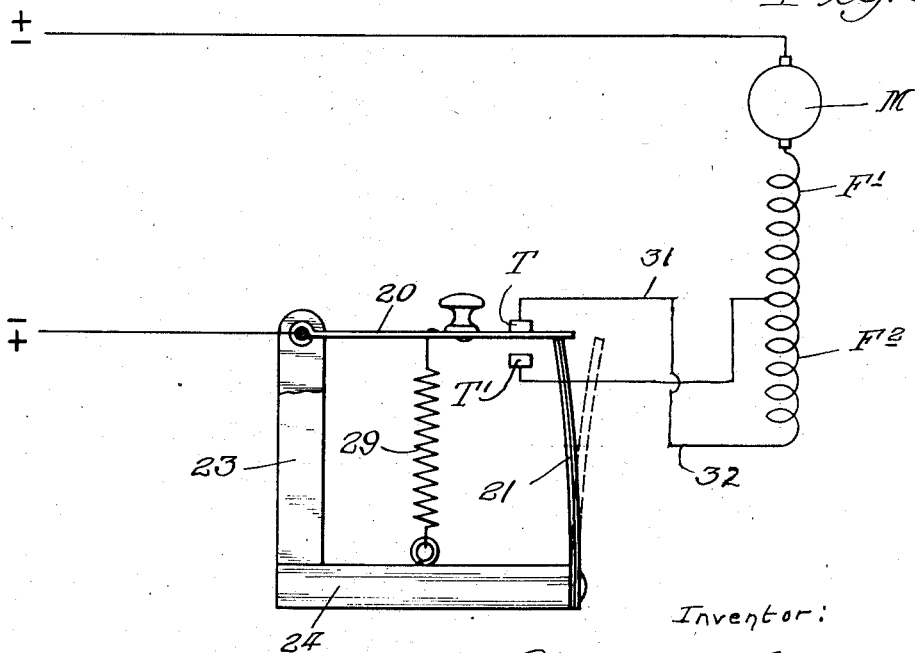
Fig. 5 is a diagram of an embodiment of my invention including a series motor having a two-section field winding, and including a bimetallic switch adapted to open a shunt around one of the field windings.

Fig. 5 diagrammatically shows the same type of two-pole thermostatic switch as used with an alternating current motor having a so-called tapped field coil comprising two sections F¹ and F², the outer end of the coil being connected by a wire 31 to the upper terminal T while the juncture of the two sections is connected by a wire 32 to the lower terminal T¹. Thus arranged, the large number of turns in the entire field winding increase the resistance and the inductance so as to reduce the speed of the motor until the bimetallic strip 21 is sufficiently flexed by a drop in temperature to release it from holding the switch member 20 against the upper terminal T, and when the switch member is released, the current flows through the section F¹ of the field coil, thereby speeding up the motor.

Moreover, other changes in construction and arrangement might be made without departing either from the spirit of my invention or from the appended claims. For example, it will be obvious (without separate illustration), that an electric buzzer might be used as an audible signal in place of the incandescent lamp of Fig. 2 as a visual signal. So also, it is to be understood that the term "ice-cream" is used in the appended claims in a generic sense including mousses and other frozen desserts.

Figure 3:
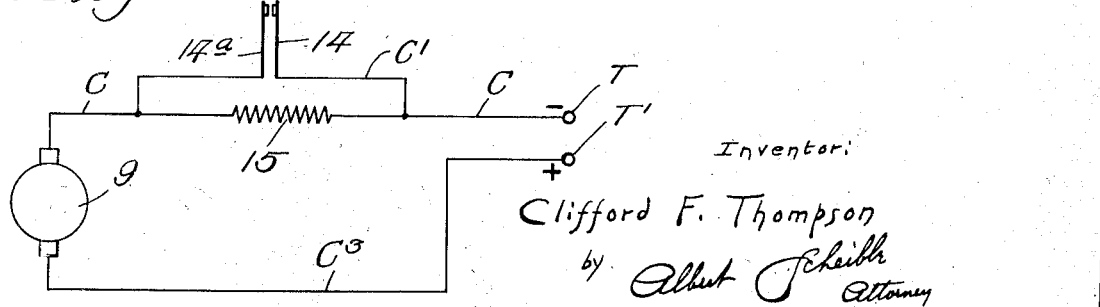
Fig. 3 is a diagram of a simplified embodiment of my invention, showing the use of a resistance for controlling the speed of the motor when the motor is not equipped with a speed regulator.

Indeed, many of the advantages of my invention can be obtained as shown in Fig. 3 by using a resistance instead of a centrifugal speed controller, this resistance 15 (which preferably would be disposed outside the refrigerator so that heat radiated by it would not warm the interior of the refrigerator) being in shunt with the circuit C¹. With the circuits arranged as in Fig. 3, the resistance series with the motor will reduce the operating speed so long as the thermostatic strips 14 and 14a are freely spaced to open the shunt circuit C¹. Then when the temperature around these strips drops so that they close the said shunt circuit, the motor will run at the higher speed which it would normally have (under the same load) if the resistance 15 were not in series with it.

I claim as my invention:

1. The combination with an ice-cream freezer including a cream container and an agitator movable within the container, of an electric motor operatively connected to the said agitator, a centrifugal switch associated with the motor for limiting the speed of the motor to a predetermined maximum, a thermostatic member in heat-conducting relation to the container, and means responsive to a drop in temperature of the said member to a certain point for rendering the said switch inoperative.

2. An ice-cream freezer as per claim 1, in which the container is metallic, including also a switch casing contiguous to the container and housing the thermostatic member.

3. The combination with an ice-cream freezer including a cream container and an agitator rotatable within the container, of an electric motor operatively connected to the said agitator, two current supply wires leading to the motor, a centrifugal switch rotated by the motor and arranged for rupturing the flow of current through one of the said wires when the motor exceeds a predetermined maximum, and a thermostatic switch in shunt with the centrifugal switch and including a thermostatic member in heat-conducting relation to cream in the container, the thermostatic switch being normally open and arranged so as to close when the temperature of the container drops to a certain point.

4. The combination recited in claim 3, including also an electrically operated signal device in shunt with the centrifugal switch.

5. In an ice-cream freezer or the like, a cream container, an agitator movable within the container; an electric motor operatively connected to the said agitator and constructed for normally rotating the agitator at a considerably higher speed than the speed needed for agitating the cream during the freezing of the latter; speed-diminishing means associated with the motor for reducing the motor speed so that the latter rotates the agitator at the said needed speed; a thermally responsive member disposed in heat-conducting relation to the said container; and means interposed between the thermally responsive member and the speed-diminishing means whereby the said member renders the speed-diminishing means inoperative when the temperature of the said member has fallen to a predetermined point.

6. In an electrically operated ice-cream freezer, a cream container; an agitator rotatable within the container, an electric motor operatively connected to the agitator for rotating the latter; two circuit wires respectively leading to the motor; a speed-controller including a make-and-break switch interposed in one of the circuit wires and adapted to open when the motor exceeds a predetermined speed; and a normally open thermostatic switch disposed in temperature-responsive relation to the said container, and said switch being adapted to close when its temperature has fallen to a certain point and being disposed in shunt with the make-and-break switch of the speed-controller.

7. In an electrically operated ice-cream freezer, an assemblage of elements as per claim 6, including an electrically actuated signal device also in shunt with the make-and-break switch.

8. In an electrically operated ice-cream freezer, an assemblage of elements as per claim 6, including an incandescent lamp also in shunt with the make-and-break switch.

9. In an electrically operated ice-cream freezer, an assemblage of elements as per claim 6, including a condenser in shunt also with both of the said switches.

10. In an electrically operated ice-cream freezer, a cream container; an agitator rotatable within the container; an electric motor operatively connected to the agitator for rotating the latter; two circuit wires respectively leading to the motor; a speed-controller including a make-and-break switch interposed in one of the circuit wires and adapted to open when the motor exceeds a predetermined speed; a secondary circuit shunting the make-and-break switch; and a normally open thermostatic switch disposed in temperature-responsive relation to the said container and interposed in the secondary circuit, the thermostatic switch being constructed for closing the secondary circuit when the temperature of the container has fallen to a predetermined point.

11. In an electrically operated ice-cream freezer, a cream container; an agitator rotatable within the container; an electric motor operatively connected to the agitator for rotating the latter, the motor being constructed for rotating the agitator at a considerably higher speed than the proper speed needed for agitating a filling of cream in the container during the freezing of the cream; speed-diminishing means associated with the motor for causing the motor to operate at the said proper speed, and control means for rendering the speed-diminishing means inoperative, the control means including a thermostatic member disposed in heat-conducting relation to the said container and constructed for operating when the temperature of the container has dropped to a predetermined point.

12. In an electrically actuated freezer for cream or the like, a container, an agitator rotatable within the container, an electric motor connected to the agitator for rotating the latter and adapted to rotate the agitator at a considerably higher rate than the speed required for agitating the cream while the latter is being frozen; speed-diminishing means associated with the motor for causing the motor to operate at a speed corresponding to the said proper speed of the agitator, the said means including an electrical instrumentality connected to a circuit of the motor; and thermally responsive means disposed in heat-conducting relation to the container, and adapted to be actuated by a drop in the temperature of the thermally responsive means to that of adequately frozen cream for making the speed-diminishing instrumentality inoperative.

13. In an electrically actuated freezer for cream or the like, a container, an agitator rotatable within the container, an electric motor connected to the agitator for rotating the latter; two current-supply circuit wires connected to the motor; a resistance interposed in one of the said wires; and a thermostatic switch in shunt with the resistance and in heat-conducting relation to the container, the said switch being constructed for closing when the temperature of the container has fallen to approximately 28 degrees Fahrenheit.

14. In an electrically actuated freezer for cream or the like, a container, an agitator rotatable within the container, an electric motor connected to the agitator for rotating the latter; speed-diminishing means associated with the motor for normally limiting the speed of a motor to a rate considerably below that at which it would otherwise rotate; thermally responsive means in heat-conducting relation to the container and adapted to be actuated by a drop in the temperature of the container to that of adequately frozen cream, and connections between the said two means whereby the actuation of the thermally responsive means by the said temperature drop renders the speed-limiting means inoperative.

15. In an electrically actuated ice-cream freezer, an assemblage comprising a cream container, an agitator movable within the container, and an electric motor operatively connected to the agitator and of ample power for rotating the agitator at a considerably higher speed than the proper speed required for agitating the cream during the freezing of the latter; means associated with the said assemblage for maintaining the agitator speed at the said proper speed; and automatic control means for rendering the aforesaid means inoperative when the temperature of cream in the container has fallen to a predetermined point, the control means including a thermostatic switch disposed in heat-conducting relation to the container.

CLIFFORD F. THOMPSON